United States Patent [19]

Scudder et al.

[11] Patent Number: 5,461,867
[45] Date of Patent: Oct. 31, 1995

[54] CONTAINER WITH INTEGRAL MODULE FOR HEATING OR COOLING THE CONTENTS

[75] Inventors: James A. Scudder, San Diego; James L. Berntsen, Ramona, both of Calif.

[73] Assignee: Insta-Heat, Inc., San Diego, Calif.

[21] Appl. No.: 250,537

[22] Filed: May 31, 1994

[51] Int. Cl.$^6$ ............................................. F25D 5/00
[52] U.S. Cl. ............................................. 62/4; 126/263.1
[58] Field of Search ............................ 62/4; 126/263 R, 126/263 D, 263 DA

[56] References Cited

U.S. PATENT DOCUMENTS

| | | | |
|---|---|---|---|
| 2,288,895 | 7/1942 | Fink | 126/263 DA |
| 2,327,447 | 8/1943 | OBrien | 126/263 DA |
| 2,850,006 | 9/1958 | Karpalo | 126/263 DA |
| 3,970,068 | 7/1976 | Sato | 62/4 |
| 4,640,264 | 2/1987 | Yamaguchi et al. | 126/263 |
| 4,741,324 | 5/1988 | Ina et al. | 126/263 DA |
| 4,784,113 | 11/1988 | Nagai et al. | 126/263 |

FOREIGN PATENT DOCUMENTS

| | | |
|---|---|---|
| 078672 | 5/1987 | Japan. |
| 048029 | 4/1990 | Japan. |
| 085283 | 6/1990 | Japan. |
| 098566 | 6/1990 | Japan. |
| 088882 | 6/1990 | Japan. |
| 085285 | 6/1990 | Japan. |
| 126528 | 10/1990 | Japan. |
| 130529 | 10/1990 | Japan. |
| 161477 | 10/1990 | Japan. |
| 025632 | 2/1992 | Japan. |
| 025631 | 2/1992 | Japan. |
| 108039 | 9/1992 | Japan. |
| 218715 | 9/1992 | Japan. |
| 279117 | 10/1992 | Japan. |
| 117921 | 4/1993 | Japan. |
| 164412 | 6/1993 | Japan. |

*Primary Examiner*—Ronald C. Capossela
*Attorney, Agent, or Firm*—Brown, Martin, Haller & McClain

[57] ABSTRACT

An outer container for holding a material, such as a food, beverage or medicine with a sealed thermic module inside the container. The thermic module contains chemical reactants that mix upon actuation of the container by a user. Mixing of the reactants produces an exothermic or endothermic chemical reaction, depending upon the reactants selected. The contents of the outer container surround a portion of the outside surface of the thermic module, thereby facilitating conduction of heat. The thermic module has a hollow module body that is closed at one end and a module cap that seals the other end of the module body. The module body contains the solid reactant, and the module cap contains the liquid reactant. The module cap has a tubular section with a flexible member closing one end and a breakable barrier closing the other end. With the exception of the barrier, the cap is of unitary construction. The cap has one or more integrally formed prongs extending from the inner surface of the disc toward the barrier. The prongs move in an axial direction toward the barrier and may also spread apart radially when the outer surface of the flexible member or an actuator connected to it is depressed by the user's finger. The dual motion of the prongs in both axial and radial directions promotes complete puncturing of the barrier and thus fast mixing of the reactants.

39 Claims, 3 Drawing Sheets

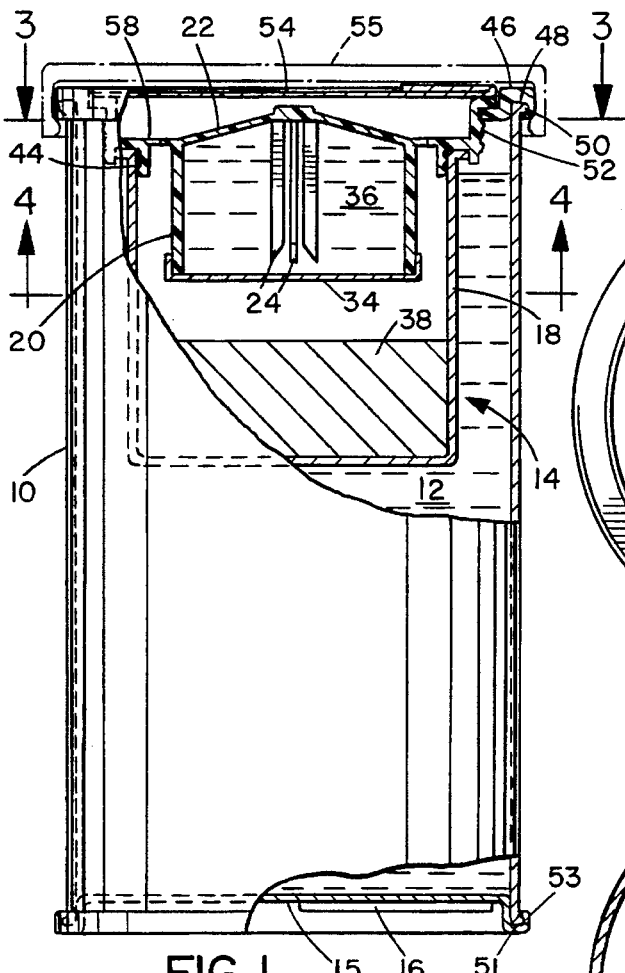
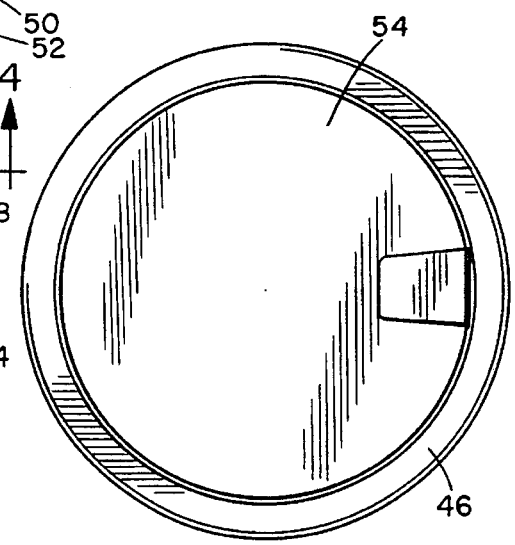
FIG. 2
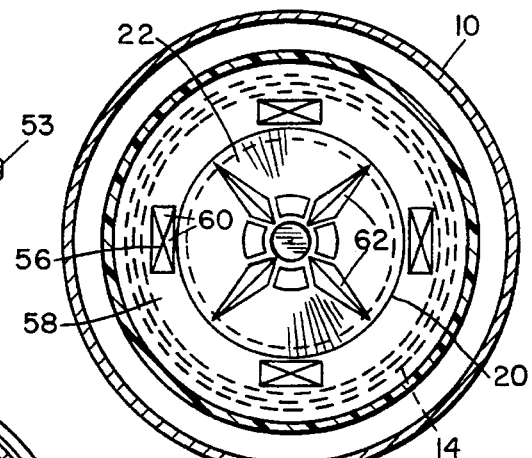
FIG. 3
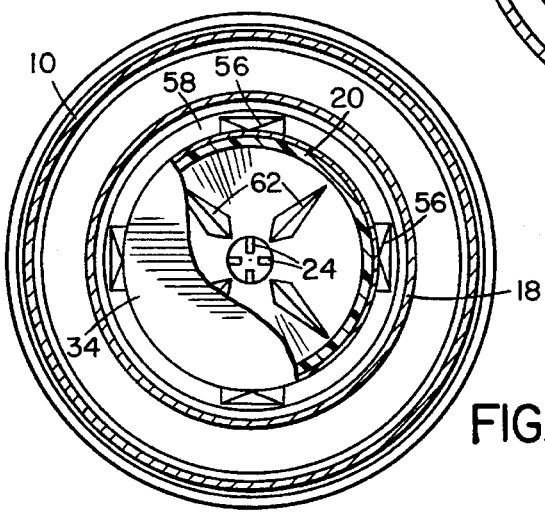
FIG. 4
FIG. 1

CONTAINER WITH INTEGRAL MODULE FOR HEATING OR COOLING THE CONTENTS

BACKGROUND OF THE INVENTION

The present invention relates generally to containers for heating or cooling materials such as food, beverages, medicines, and the like and, more specifically, to a container that includes an internal module that adds heat to or removes heat from the materials in the surrounding container.

Containers may have integral modules for warming materials in the container, such as Japanese sake, coffee, or soup. Examples of such self-heating containers are disclosed in U.S. Pat. No. 4,640,264, issued to Yamaguchi et al., and U.S. Pat. No. 4,784,113, issued to Nagai et al. Such containers typically include an outer can, in which the food or beverage is sealed, and a sealed module or inner can that contains two chemical reactants. The reactants are stable when separated from one another but, when mixed, produce an exothermic reaction. It is known that combinations of other reactants will produce endothermic reactions to cool the container contents. (Both types of reactions involve a change in enthalpy.)

The inner can is typically disposed adjacent one end of the outer can. The inner can has two chambers, each of which contains one of the chemical reactants, separated by a breakable barrier such as metal foil or a thin plastic film. Typically, one of the reactants is in solution and the other is in a solid powdered or granular form. A rod extends into the outer can at the end adjacent the inner can. One end of the rod is adjacent to the barrier, and the other end terminates in a button outside the outer can. To initiate the reaction that warms or cools the contents of the outer can, the can is disposed with that end upright. Depressing the button forces the rod downward, breaking the barrier and allowing the liquid reactant to drop into the solid reactant. The end of the rod may have a flared head to facilitate complete puncturing of the barrier. The heat produced by the resulting exothermic reaction or used by the resulting endothermic reaction is transferred between the inner can and the contents of the outer can by conduction. Exothermic reactions also typically generate a gas, which is allowed to escape through vents in the end of the container. When the reaction has stopped, the container is inverted. The second end of the outer can has a seal, such as pull-tab, that may be opened and through which the user may consume the heated contents.

Self-heating and self-cooling containers known in the art are uneconomical to manufacture because the mechanism for puncturing the foil barrier commonly has multiple components. The inner can contains the solid reactant and has a short, tubular cap sealing one end. The cap contains the liquid reactant. One end of the cap is sealed with the foil barrier, and the rod extends through an opening in the other end of the cap. Depressing the button forces the rod to slide in the opening until it punctures the foil barrier. Practitioners in the art have found that forcing a rod through the foil opens a large passage through which the liquid reactant can flow, thereby minimizing the time required for the liquid to drain from the cap into the remainder of the inner can. However, fabricating and assembling the multiple components increases the cost of the container. Furthermore, liquid can leak between the rod and the opening in the cap through which the rod moves. Practitioners in the art have therefore disposed a ring of wax around the rod where it exits the inner can to improve sealing. The step of adding the wax, however, increases the manufacturing complexity and, ultimately, cost of the container. Self-heating and self-cooling containers known in the art may also leak the powdery material that is the product of the completed reaction through the vents when the container is inverted. It would be desirable to provide an inner can or module that has both a minimal number of separate parts and maximal resistance to leakage. It would also be desirable to provide such a container with improved sealing between the inner can or module and the outer can. These problems and deficiencies are clearly felt in the art and are solved by the present invention in the manner described below.

SUMMARY OF THE INVENTION

In one aspect, the present invention comprises an outer container body for holding a material, such as a food, beverage or medicine and a sealed thermic module inside the container body that contains chemical reactants that mix upon actuation of the container by a user. Mixing of the reactants, which may comprise any suitable chemical compounds or mixtures, produces an exothermic or endothermic chemical reaction, depending upon the reactants selected. The contents of the outer container body surround a portion of the outside surface of the thermic module, thereby facilitating conduction of heat.

In another aspect, the present invention comprises a novel module that may be used in the above-described self-heating or self-cooling container to produce an exothermic or endothermic reaction. The module comprises a hollow module body that is closed at one end and a module cap that seals the other end of the module body. The module body contains a first material, and the module cap contains a second material. Although these materials may comprise any compounds or mixtures known in the art, in an illustrative embodiment the first material is a solid reactant, and the second material is a liquid reactant, which produce an exothermic or endothermic reaction upon mixing. The module cap has a tubular cap body with a flexible member closing one end and a breakable barrier closing the other end. The cap has one or more prongs extending toward the barrier from one or more points on the inner surface of the flexible member. With the exception of the barrier, the cap is of unitary construction.

A user may depress the outer surface of the flexible member with a finger to actuate the container. Prior to actuation, the flexible member is in a retracted position. In response to the force applied to the flexible member by the user, the prongs move in an axial direction, i.e., toward the barrier, and may also spread apart radially. The dual motion of the prongs in both axial and radial directions promotes complete puncturing of the barrier and thus fast mixing of the first and second materials. After removing finger pressure from the flexible member, it may snap or lock into the depressed or extended position with the prongs extended or it may resiliently resume the retracted position.

The flexible member may have any suitable shape that allows multiple points on its inner surface to move in an at least partially axial direction in response to a force having at least a component in that direction. For example, the inner surface of the flexible member may have a concave or dished shape (when viewed from the interior of the cap body) prior to actuation of the container and extend to a convex shape upon actuation. Alternatively, it may have a generally flat shape prior to actuation of the container and extend to a convex or bulbous shape (when viewed from the interior of the cap body) upon actuation. The shape of the inner surface of the flexible member may be described in terms of the locations of multiple points on it. In the former example, prior to actuation, different points on the inner surface of the flexible member are at different axial distances. If the inner surface of such a flexible member has a shape that is symmetric about a central axis, such as a hemisphere or other symmetric dome, points at different radial distances from the axis are at different axial distances, and points at any given radial distance are at the same axial distance. In the latter example, prior to actuation, all points on the inner surface of the flexible member are at the same axial distance. Still other shapes, such as an accordian-like, button-shape, may also be suitable. In response to the actuation force, the entire flexible member may flex or only portions of it may flex. The actuation force, however, may be applied to any movable or deflectable portion, flexible or non-flexible. The flexible member may be made of a semi-rigid material such as plastic or an elastomeric material such as rubber.

The module body may have one or more vents disposed around the periphery of the cap that function as check valves to allow gaseous products of a reaction to escape while minimizing leakage of solids. Each vent may have one or more resilient flaps. Each flap has at least one lip or edge that meets a lip of another flap or a (non-resilient) portion of the module body to form a seal. The flaps remain firmly closed prior to activating the module, thereby minimizing leakage of the solid reactant. When the module is activated, the flaps flex and open the seal in response to the pressure of the gas inside the body of the module. The flaps close as the pressure decreases.

After the reaction in a self-heating or self-cooling container is started, the user may invert the container. After the reaction is completed, the user may remove a closure, such as a pull tab, to access the contents for consumption. Despite the then-inverted orientation of the module, the closed vents minimize leakage of solid reaction products. (The liquid reactant does not leak because it is used up in the reaction or absorbed by the solids.)

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a side elevational view of the container, partially cut-away;

FIG. 2 is a plan view of the container;

FIG. 3 is a sectional view taken along line 3—3 of FIG. 1;

FIG. 4 is a sectional view taken along line 4—4 of FIG. 1;

DESCRIPTION OF A PREFERRED EMBODIMENT

Figure 6:
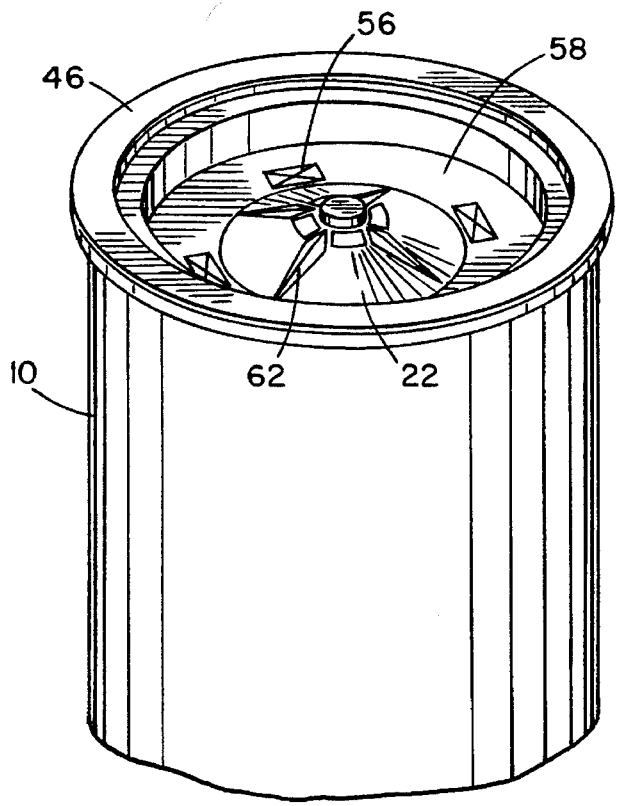
FIG. 6 is a partial perspective view of the container of FIGS. 1–5.

As illustrated in FIGS. 1–4, a container comprises a cylindrical container body 10, which may contain a beverage 12, and a thermic module 14 for heating beverage 12. Thermic module 14 seals one end of container body 10, and an endcap 15 with a pull-tab closure 16 of the type commonly used to seal beverage cans seals the other end. An exterior view of the end of the container at which thermic module 14 is disposed is shown in FIG. 6. When the container is actuated, as described below, thermic module 14 generates heat, which is transferred by conduction to beverage 12. The container may then be inverted and pull-tab closure 16 opened to allow beverage 12 to be consumed.

Thermic module 14 comprises a cylindrical module body 18 and a cylindrical module cap 20. Module cap 20 is of unitary construction and is made of a semi-rigid plastic, such as high density polyethylene. Module cap 20 has an actuator disc 22 and four prongs 24. A breakable barrier 34 made of metal foil is adhesively attached to module cap 20. Barrier 34 seals water 36 inside module cap 20. Module body 18 contains a solid chemical 38 such as calcium oxide, commonly known as quicklime. An annular cap channel 40 receives the lip 42 of module body 18, thereby sealing solid chemical 38 inside. Cap channel 40 may have crushable dimples 44 that improve sealing. Module body 18 is preferably made of a metal, such as aluminum.

As mentioned above, the container is sealed at both ends. Sealing ring 46 secures thermic module 14 in container body 10. Sealing ring 46 has a ring channel 48 that receives the hook-like lip 50 of container body 10. Sealing ring 46 is crimped over lip 50 to form a tight seal. At the opposite end of the container, endcap 15 has a similar endcap channel 51 that receives the opposite lip 53 of container body 10. Endcap 15 is crimped over the opposite lip 53 of container body 10 in a similar manner. A sealing compound (not shown) of the type commonly used in the can industry may be disposed in ring channel 48 to further improve sealing. Thermic module 14 is press-fit in the opening of sealing ring 46. The portion of thermic module 14 that contacts sealing ring 46 may have crushable dimples 52 to further improve sealing.

To actuate the container, a safety seal 54, which is adhesively attached to thermic module 14, must be removed or broken. Safety seal 54 minimizes the possibility of tampering or inadvertent actuation of the container. Although safety seal 54 may be plastic, foil, paper or other suitable films, it is preferably transparent to allow viewing of actuator disc 22. The container may also have an outer lid 55 made of plastic that snaps over the end of container body 10. Outer lid 55 not only further reduces the likelihood of inadvertent actuation, but can also be used to retain condiments such as a packet of sugar (not shown) or a promotional item such as a coupon (not shown) between it and safety seal 54. Lid 55 may be transparent.

Figure 5:
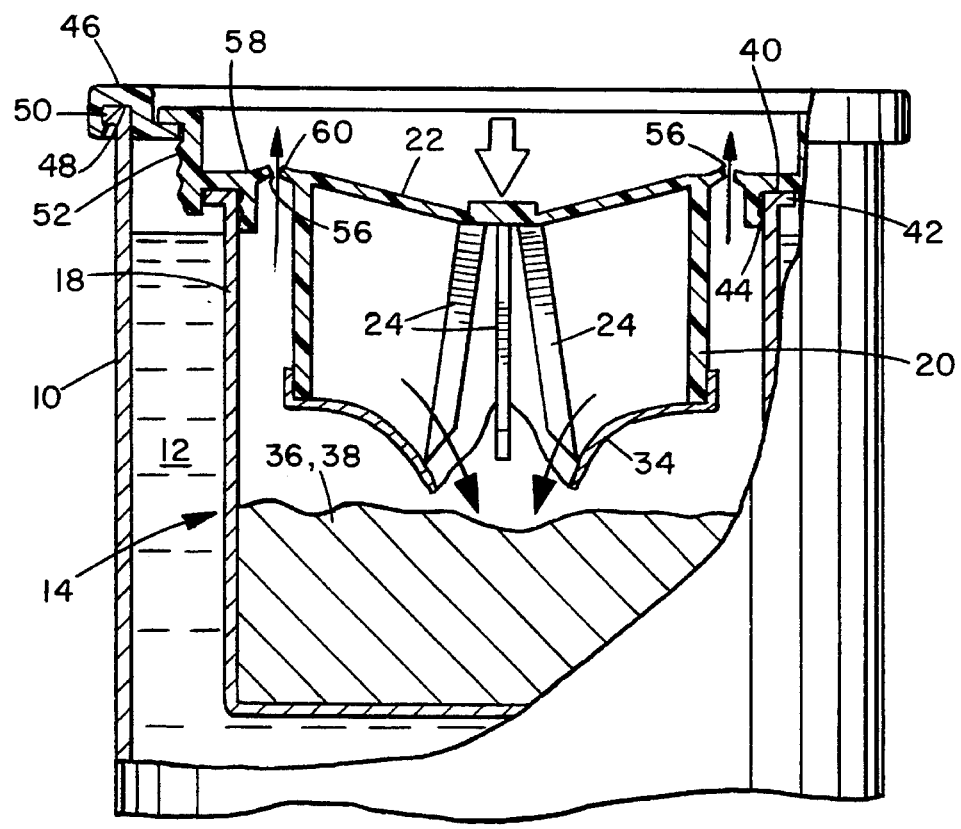
FIG. 5 is an enlarged view similar to FIG. 1, showing actuation of the container.

As illustrated in FIG. 5, when an axially directed force is applied at or near the center of actuator disc 22, it flexes toward barrier 34. The distal ends of prongs 24 both move axially and spread apart radially to facilitate complete puncturing of barrier 34. Water 36 flows through the punctured barrier 34 and mixes with solid chemical 38. The resulting exothermic reaction produces heat, which is transferred to beverage 12 by conduction through module body 18, and carbon dioxide, which escapes through four vents 56 that are distributed around an annular lip 58 between module body 18 and module cap 20.

Figure 7:
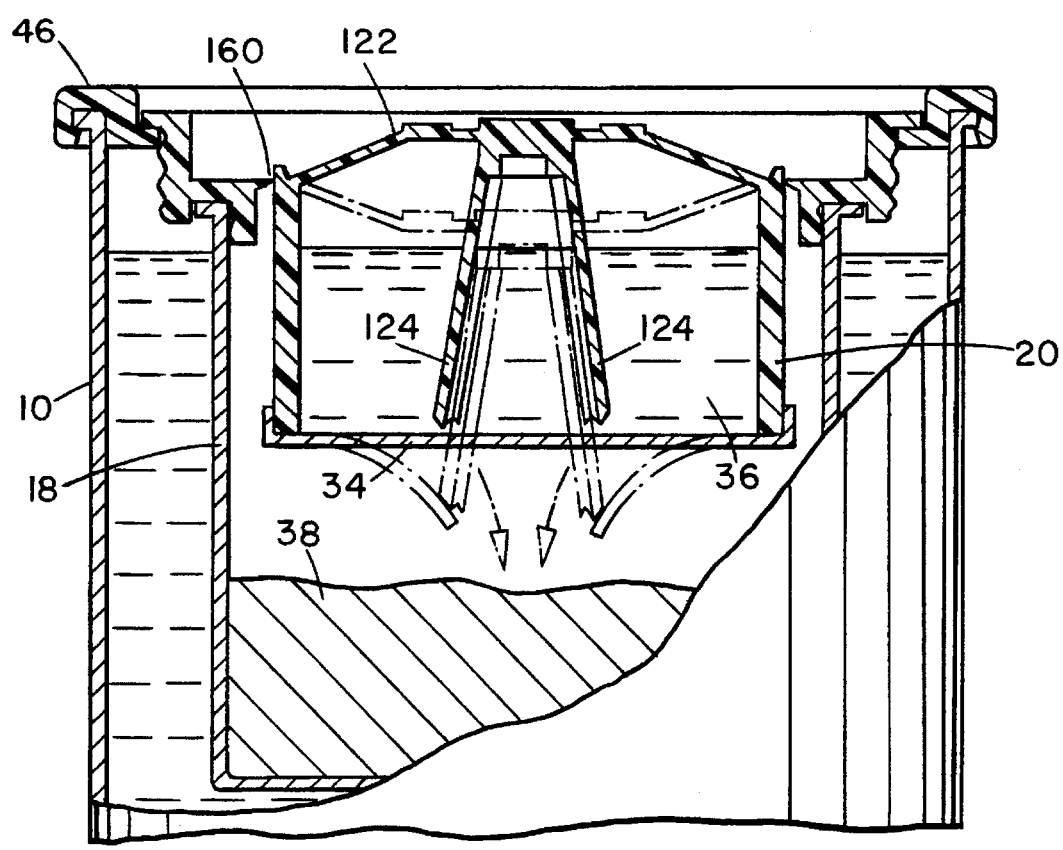
FIG. 7 is an enlarged view similar to FIG. 5, showing an alternative construction of the module cap.

As best illustrated in FIGS. 3 and 4, vents 56 may comprise four flexible triangular flaps 60, which are in contact with one another when the pressures inside and outside module 14 are equal, but which spread apart to release the gas produced by the reaction. Alternatively, as illustrated in the embodiment shown in FIG. 7, a vent may be formed by a single flap 160.

In the retracted position of actuator disc 22, i.e., before the container is actuated, actuator disc 22 may appear convex or dome-shaped when viewed from the outside of the container, as shown in FIGS. 1 and 6. In its extended position, i.e., after the container has been actuated, actuator disc 22 may appear concave or dished, as shown in FIG. 5. Actuator disc 22 is preferably stable in both the extended and retracted positions, and "snaps" into the extended position when the container is actuated. The snapping action provides a positive visual and tactile indication to the user that the container has been actuated. At least a portion of actuator disc 22 must flex during the transition between the retracted and extended positions. In the illustrative embodiments, four radial folds 62 facilitate this transition by reducing the amount of force required to flex actuator disc 22. However, in other embodiments, actuator disc 22 may have more, fewer, or no radial folds 62.

Prongs 24 are distributed around the center of actuator disc 22 at the same radial distance. Prongs 24 may be formed by cutting lengthwise a tubular cylinder that is integrally molded in module cap 20. The resulting prongs 24 have sector-shaped cross-sections. Although in the illustrated embodiments, module cap 20 has prongs 24 distributed about the center of actuator disc 22, in other embodiments module cap 20 may have only a single central prong.

Furthermore, the portions of actuator disc 22 that flex when the container is actuated may be at any radial distance from the central axis and may have any suitable shape. They may be concentrated at one or more substantially discrete radial distances or may be continuous over all radial distances. In the embodiment illustrated in FIGS. 1–6, portions of actuator disc 22 that are between prongs 24 are flexible, thereby causing prongs 24 to spread apart radially when the container is actuated. In the alternative embodiment illustrated in FIG. 7, however, the portions of the alternative actuator disc 122 that flex are at greater radial distances than the prongs 124. The flat central portion of actuator disc 122 where prongs 124 are disposed does not flex. Therefore, prongs 124 do not spread apart radially when the container is actuated. Although prongs 124 preferably have a slight radial cant with respect to the central axis of the container, prongs 124 remain in that orientation regardless of whether actuator disc 122 is in the extended or retracted position. Such an embodiment facilitates injection molding because the areas of flexure are not adjacent to prongs 124.

Container body 10 may be made of any suitable material, such as cardboard, metal or plastic. A cardboard body 10 resists heat conduction and will thus not be uncomfortable for a user to hold after actuating the container. However, it is known in the art that solid chemical 38 and water 36 can be replaced with suitable combinations of chemicals for producing an endothermic reaction, which would cool beverage 12. In embodiments that cool a carbonated beverage, container body 10 should be made of metal or plastic because such materials would facilitate the formation of gas-tight seals.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A module for selectably mixing two materials, comprising:
   a container having a container opening, said container for holding a first one of said materials;
   a cap disposed in said opening of said container for selectably containing a second one of said materials, said cap having a hollow cap body having first and second ends and an axis;
   a flexible member integrally formed with said cap body, said flexible member having an inner surface, an outer surface, at least one point on said inner surface moving in at least a partially axial direction with respect to said cap body between a retracted position and an extended position in response to an axial force experienced on said outer surface of said flexible member;
   at least one elongated member integrally formed with said cap body, said elongated member having a proximal end disposed at said point and a distal end projecting from said point; and
   a breakable barrier attached to said second end of said cap body, said distal end of said elongated member extending beyond said second end of said cap body when said point on said inner surface is in said extended position.

2. The module recited in claim 1, wherein said flexible member snaps between a first position in which said point on said inner surface is in said retracted position and a second position in which said point on said inner surface is in said extended position.

3. The module recited in claim 1, wherein:
   a plurality of points on said inner surface move in at least partially axial directions with respect to said cap body between a retracted position and an extended position in response to an axial force experienced by said outer surface of said flexible member; and
   a plurality of elongated members are unitarily formed with said cap body, each said elongated member having a proximal end disposed at one said point and a distal end projecting from said point toward said cap body.

4. The module recited in claim 3, wherein said inner surface has a plurality of points at different axial distances from said first end of said cap body when all said points are in said retracted position.

5. The module recited in claim 4, wherein said elongated members have proximal ends at points the same axial distance from said first end of said cap body.

6. The module recited in claim 5, wherein said inner surface of said flexible member is substantially concave when each said point at which a proximal end of one said elongated member is disposed is in said retracted position.

7. The module recited in claim 6, wherein said flexible member snaps between a first position in which each said point at which a proximal end of one said elongated member is disposed is in said retracted position and a second position in which each said point at which a proximal end of one said elongated member is disposed is in said extended position.

8. The module recited in claim 6, wherein:
   said flexible member is a disc having a central axis; and
   said points at which said proximal ends of said elongated members are disposed at equal radial distances from said central axis and are separated by equal angles having a vertex at said central axis.

9. The module recited in claim 8, wherein said elongated members are parallel to one another when said points at which said proximal ends are disposed are in said retracted position.

10. The module recited in claim 9, wherein:

said plurality of elongated members have arcuate outer surfaces; and said outer surfaces of said elongated members define adjacent segments of a circle when said points at which said proximal ends are disposed are in said retracted position.

11. The module recited in claim 10, wherein the number of elongated members in said plurality of elongated members is four.

12. The module recited in claim 6, wherein:

said flexible member has a plurality of radial folds separated by equal angles for facilitating flexure of said flexible member; and said proximal end of each said elongated member is disposed between two said folds.

13. The module recited in claim 12, wherein:

said flexible member is a disc having a central axis; and said points at which said proximal ends of said elongated members are disposed at equal radial distances from said central axis and are separated by equal angles having a vertex at said central axis.

14. The module recited in claim 13, wherein said elongated members are parallel to one another when said points at which said proximal ends are disposed are in said retracted position.

15. The module recited in claim 14, wherein:

said plurality of elongated members have arcuate outer surfaces; and said outer surfaces of said elongated members define adjacent segments of a circle when said points at which said proximal ends are disposed are in said retracted position.

16. The module recited in claim 15, wherein:

the number of elongated members in said plurality of elongated members is four; and said radial folds are separated by angles of 90 degrees.

17. A module for selectably mixing two materials, comprising:

an inner container having a container opening, said inner container for holding a first one of said materials;

a cap disposed in said opening of said container for selectably containing a second one of said materials, said having a tubular cap body having first and second ends and an axis;

a flexible disc integrally formed with said cap body and disposed at said first end of said cap body, said flexible disc having a central axis coaxial with said axis of said cap body, an inner surface, an outer surface, and a plurality of radial folds, a plurality of points on said inner surface moving in a partially axial direction with respect to said cap body between a retracted position and an extended position in response to an axial force experienced by said outer surface of said flexible disc;

a plurality of elongated members integrally formed with said cap body, each said elongated member having a proximal end disposed at one point of said plurality of points and a distal end projecting from said point; and a breakable barrier attached to said second end of said cap body, said distal end of each said elongated member extending beyond said second end of said cap body when said point on said inner surface at which said proximal end of said elongated member is disposed is in said extended position.

18. The module recited in claim 17, wherein said flexible disc snaps between a first position in which each said point at which a proximal end of one said elongated member is disposed is in said retracted position and a second position in which each said point at which a proximal end of one said elongated member is disposed is in said extended position.

19. The module recited in claim 18, wherein said points at which said proximal ends of said elongated members are disposed at equal radial distances from said central axis and are separated by equal angles having a vertex at said central axis.

20. The module recited in claim 19, wherein said elongated members are parallel to one another when said points at which said proximal ends are disposed are in said retracted position.

21. The module recited in claim 20, wherein:

said plurality of elongated members have arcuate outer surfaces; and said outer surfaces of said elongated members define adjacent segments of a circle when said points at which said proximal ends are disposed are in said retracted position.

22. The module recited in claim 21, wherein the number of elongated members in said plurality of elongated members is four.

23. A module for selectably mixing two materials, comprising:

a container having an opening, said container for holding a first one of said materials;

a cap disposed in said opening of said container for selectably containing a second one of said materials, said cap having a hollow cap body with first and second ends and an axis, said cap having a breakable barrier attached to said second end of said cap body and a plurality of elongated members, each having a proximal end at said first end of said cap body and a distal end extending toward said second end of said cap body;

said distal ends of said elongated members moving in unison partially axially and partially radially between a retracted position and an extended position in response to an axial force experienced by a movable portion of said cap; and said distal ends of said elongated members extending beyond said second end of said cap body in said extended position.

24. The module recited in claim 23, wherein said movable portion of said cap is a flexible disc.

25. The module recited in claim 24, wherein said flexible disc snaps between a first position in which each said distal end of one said elongated member is disposed is in said retracted position and a second position in which each said distal end of one said elongated member is disposed is in said extended position.

26. The module recited in claim 25, wherein said elongated members are parallel and coaxial with said axis of sid cap body when said distal ends are in said retracted position.

27. The module recited in claim 26, wherein:

said flexible disc has a plurality of radial folds separated from one another by equal angles; and said proximal end of each said elongated member is between two said folds.

28. The module recited in claim 27, wherein:

said elongated members have arcuate outer surfaces; and said outer surfaces of said elongated members define adjacent segments of a circle when said distal ends are disposed in said retracted position.

29. The module recited in claim 28, wherein the number of elongated members in said plurality of elongated members is four.

30. A container for selectably changing the temperature of a stored material, comprising:

a tubular container body for holding said stored material, said container body having first and second ends;

a thermic module inside said container body, said thermic module comprising a tubular module body for containing a first reactant, an annular rim around said module body, and a module cap inside said module body, said module cap for containing a second reactant, said module cap having an actuator end disposed in said first end of said container body for initiating mixing of said first and second reactants, said mixing of said reactants producing a reaction characterized by a change in enthalpy;

said annular rim having a plurality of vents between said cap and said module body for releasing pressure in said module body, said vents closing when said pressure in said module body substantially equals atmospheric pressure outside said container; and a removable closure in said second end of said container body for providing access to said stored material.

31. The container recited in claim 30, wherein each said vent comprises at least one flexible flap having one or more portions in substantial contact with at least one other of said flexible flaps when said pressure in said module body substantially equals air pressure outside said container, said flaps flexing in response to a differential between said pressure in said module body and said atmospheric pressure.

32. The container recited in claim 31, wherein each said flexible lip has a portion in substantial contact with all other said flexible flaps.

33. The container recited in claim 32, wherein vent comprises four flexible flaps, each having two sides, each said side in substantial contact with one said side of another one of said flexible flaps.

34. The container recited in claim 30, wherein said module cap has an annular cap channel for receiving a portion of said module body.

35. The container recited in claim 30, wherein said rim has an annular rim channel for receiving a portion of said container body.

36. The container recited in claim 35, wherein said container body has an annular flange for engaging a correspondingly shaped recess in said rim channel.

37. The container recited in claim 30, further comprising a removable cover for covering said actuator end of said module cap.

38. The container recited in claim 37, wherein said removable cover comprises a film.

39. The container recited in claim 37, wherein said removable cover comprises a plastic lid.

* * * * *